United States Patent [19]

Stegmaier

[11] Patent Number: 4,836,248

[45] Date of Patent: Jun. 6, 1989

[54] HYDRAULIC ELECTROMAGNETICALLY ACTUATED SLIDE VALVE

[75] Inventor: Alwin Stegmaier, Schwieberdingen, Fed. Rep. of Germany

[73] Assignee: Robert Bosch GmbH, Stuttgart, Fed. Rep. of Germany

[21] Appl. No.: 421,671

[22] Filed: Sep. 22, 1982

[30] Foreign Application Priority Data

Jun. 29, 1982 [DE] Fed. Rep. of Germany ....... 3224119

[51] Int. Cl.⁴ ............................................. F16K 31/02
[52] U.S. Cl. ......................... 137/625.65; 251/129.15
[58] Field of Search ................... 137/625.65; 251/129, 251/141, 129.15

[56] References Cited

U.S. PATENT DOCUMENTS

| | | | |
|---|---|---|---|
| 2,893,428 | 7/1959 | Collins | 137/625.65 |
| 2,999,192 | 9/1961 | Lambert | 251/129 X |
| 3,108,777 | 10/1963 | Ray | 251/129 X |
| 3,554,234 | 1/1971 | Kurtz | 137/625.64 |
| 3,647,177 | 3/1972 | Lang | 251/129 |
| 3,653,630 | 4/1972 | Ritsema | 251/129 |
| 3,815,633 | 6/1974 | Greenwood et al. | 137/625.65 X |
| 3,851,285 | 11/1974 | Rothfuss et al. | 251/129 X |
| 3,865,140 | 2/1975 | Greenwood | 137/625.64 |
| 3,929,315 | 12/1975 | Rieth | 251/129 |
| 3,995,652 | 12/1976 | Belart et al. | 137/625.65 X |
| 4,071,042 | 1/1978 | Lombard et al. | 251/129 X |
| 4,124,192 | 11/1978 | White | 251/129 |
| 4,201,116 | 5/1980 | Martin | 137/625.64 X |

Primary Examiner—A. Michael Chambers
Assistant Examiner—John C. Fox
Attorney, Agent, or Firm—Edwin E. Greigg

[57] ABSTRACT

A hydraulic slide valve with electromagnetic actuation is proposed, the magnet armature of which is embodied by a hollow-cylindrical tube element. The lower bearing location of the magnet armature is provided by the slide of the hydraulic valve, which with a corresponding step engages the inner bore of the armature; the upper bearing location is embodied by a slide element attached to a stationary cover plate.

8 Claims, 1 Drawing Sheet

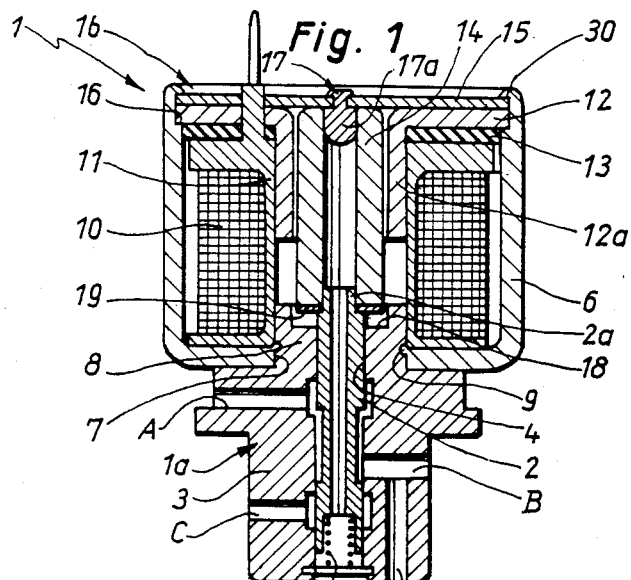
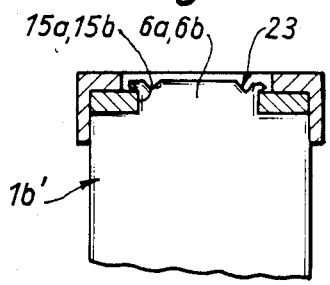
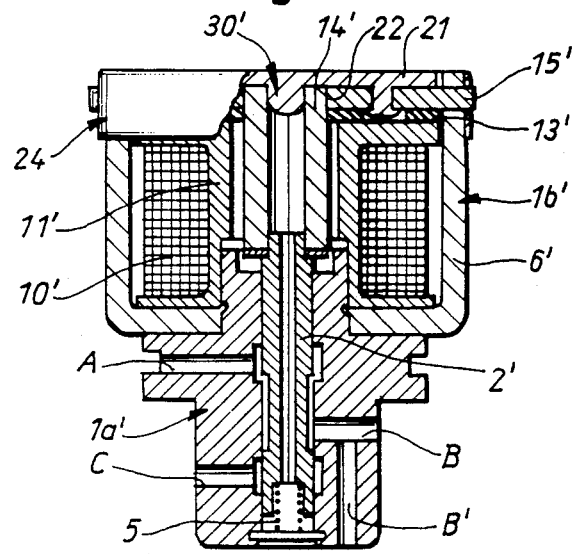
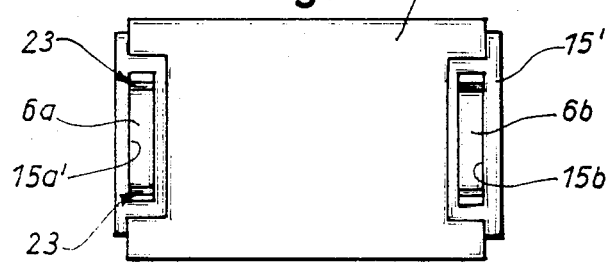

HYDRAULIC ELECTROMAGNETICALLY ACTUATED SLIDE VALVE

BACKGROUND OF THE INVENTION

The invention is directed to a hydraulic, electromagnetically actuated slide valve. Hydraulic valves having a slide which undergoes a shift in its position under the influence of an associated electromagnetic element, for switchover into other switching positions, via a magnet armature are known in many forms. The hydraulic valve element may perform a multiplicity of functions, and partially excited states of the magnet are also possible, so that multiple-position slide valves can assume positions located between the two end positions of the slide. For smoothness of operation and functional reliability of a hydraulic magnetic valve of this kind, satisfactory and low-friction support and guidance of the magnet armature must be provided. It is accordingly known to support the magnet armature by means of a leaf spring suspension. Ball bearings or other slide bearings guided at the outside are also known, which are provided directly in the winding carrier or with the aid of bushings, such as brass sheaths, plastic bushings, or the like.

There is a need for a magnetic valve in which the magnet armature is structured at a favorable cost and is guided in a low-friction, reliable, and centered manner.

OBJECT AND SUMMARY OF THE INVENTION

This object is attained by the hydraulic, electromagnetically actuated slide valve according to the invention and has the advantage over known valves that guiding the magnet armature, which is embodied as a hollow cylinder, on the inside produces a tubular armature structure which is favorable in cost. The same is true of its slide bearing construction, because one armature bearing, oriented toward the slide of the hydraulic valve, is furnished by the slide itself. The upper bearing is effected with the aid of a stationary sliding piece, in bolt or cylinder form, which engages the inner bore of the armature to provide reliable and centered guidance. Supporting the armature in this manner makes tilting impossible and avoids errors in alignment or assures that any such errors will not be critical. Such a support assures low friction on the part of the magnet armature guidance as a whole, and is not vulnerable to soiling. A further advantage is that fine machining is not required.

The characteristics disclosed herein relate to advantageous developments of and improvements to the slide valve disclosed. A magnet armature bearing guided on the inside according to the invention is possible for both rotationally symmetrical and rectangular magnetic elements, and in both cases the expenditure for assembly and materials is reduced substantially.

The invention will be better understood and further objects and advantages thereof will become more apparent from the ensuing detailed description of two preferred embodiments taken in conjunction with the drawings.

BRIEF DESCRIPTION OF THE DRAWINGS

FIG. 1 shows a first exemplary embodiment of a magnetic valve having a rotationally symmetrical electromagnet structure, seen in a vertical sectional view; and FIG. 2a illustrates a vertical section view of a second exemplary embodiment of a magnetic valve having a rectangular magnet element;

FIG. 2b is a view showing the detail of a particular type of fastening used in the second exemplary embodiment;

FIG. 2c is a plan view of the second exemplary embodiment.

DESCRIPTION OF THE PREFERRED EMBODIMENTS

The basic concept of the present invention is a hydraulic magnetic valve having a slide driven by means of an armature of an electromagnet, in which the armature is supported by guiding the armature on the inside and therefore embodying it in tubular or hollow-cylindrical form.

In the first exemplary embodiment shown in FIG. 1, the whole magnetic valve is identified by reference numeral 1; it includes a hydraulic valve element 1a and an electromagnetic element 1b. The illustrated exemplary embodiment accordingly relates to a so-called 3/2-way magnetic valve, that is, a magnetic valve which has three connections A, B and C and in which the slide 2 is movable into two end positions in order to perform its function. As shown, a fourth connection B' connects with the B connection.

The actual structure and function of the magnetic valve need not be discussed in detail, because they are not part of the present invention; it should be noted merely that the slide 2 is supported in a slidably displaceable manner in a housing block 3 of the hydraulic valve element 1a and has appropriate control edges so as to connect the various transverse bores leading to the valve connections with one another or to separate them. The slide 2 operates in a central bore 4 in the housing block 3, and it is of significance to the invention that this bore 4 and thus the slide 2 as well are embodied as central and thus coaxial with respect to the movable part of the electromagnet 1b.

In the upper "end" position of the slide 2 shown in FIG. 1, the slide is effected by a pre-stressing spring 5, and the slide 2 connects the valve connection A with the valve connection B and the branch B'. When the associated electromagnet is excited, the slide is moved to the lower end position in which the valve connection C communicates with the connection B,B'.

The electromagnet, which will be described later, is secured in a working relationship with the valve by a housing 6. The housing 6 constitutes a cup-shaped holder and primary bearing part 6 for the electromagnet zone, having an opening 7 disposed in the bottom, and is mounted and secured centrally on a shoulder embodied by a protrusion 8 on the housing block 3 of the hydraulic magnetic valve, for instance as shown at 9. The annular opening at the bottom is braced annularly against the protrusion 8 when the primary bearing part 6 is in its mounted position. The result is a more reliable and immovable fixation and a satisfactorily centered connection between the primary bearing part for the electromagnet and the bearing or housing block of the hydraulic valve element.

The remaining structure of the electromagnetic element 1b comprises a carrier 11 on which a winding 10 is wound and introduced from above into the main bearing part 6. All of these elements may, in the exemplary embodiment shown in FIG. 1, be rotationally symmetrical. The winding 10 and winding carrier 11 are clamped and secured in the housing by means of an annular auxiliary holder element including a cylindrical downwardly extending portion 12a and an outwardly extending flange 12. The cylindrical portion 12 extends into the carrier 11 and the flange extends to the housing above the carrier 11. As shown, an intermediate soft-rubber plate 13 may be placed between the carrier 11 and the flange 12 which functions as a yielding and sealing element. The downward extending cylindrical portion 12a of the auxiliary holder element does not serve to guide the outside of the magnet armature 14; instead, it merely secures the remaining components of the electromagnetic element, especially the winding 10 and the winding carrier 11, within the housing. An upper cover plate element 15 is secured over the annular auxiliary holder element which together with the auxiliary holder element 12 is secured in place above a central annular shoulder 16 on the primary bearing element 6. Securing and covering of the elements in final form can be accomplished by means of a crimped rim 30 at the top of the primary bearing element 6, so that the overall result is a solid and reliable connection and clamping together of all the elements described thus far.

The magnet armature 14 is embodied as a hollow cylinder, or in other words is tubular, so that its inner wall surface functions as a bearing surface. The magnetic armature is coaxial with the carrier 11, the coil 10, and the cylindrical portion 12a of the annular auxiliary holder. Tilt-free guidance of the magnetic armature is brought about by engagement of the lower end of the armature with a protrusion 2a on the upper end of the valve slide 2 which protrudes into the inner bore of the armature. A bearing location on upper end of the armature, which represents the sole slide bearing point for the armature bearing, is formed by a slide-element 17, which is held stationary in the cover plate 15 and includes an inwardly pointing slide part 17a which engages the inner bore of the upper portion of the armature. The slide element 17 may be a ball, a bolt, a cylinder pin or some other element which is connected with the cover plate 15 for instance by riveting, screwing or the like or is secured to the cover plate 15. The cover plate 15 simultaneously acts as the upper stroke limitation means for the magnet armature 14; the lower stroke limitation is the result of movement of the magnetic armature 14 to the bottom of a central annular recess 18 in the protrusion 8 of the bearing block 3 for the hydraulic valve element as the slide 2 is moved against spring 5.

In an advantageous embodiment, when the cover plate 15 is embodied of metal, it is also possible to embody this element with a central, deep-drawn middle hub as an integral part of the cover plate 15, instead of the slide element 17. This hub then simultaneously embodies the slide element. It is furthermore within the scope of the invention to embody the auxiliary holder element solely as an annular plate, having a central bore for the magnetic armature to pass through; in other words, the tubular protuberance pointing downward would then be lacking.

The tubular magnetic armature 14 dips into the annular recess 18, causing a displacement movement of the slide 2; a remnant air gap disc 19, preferably of nonmagnetic material, may be disposed between the bottom of the annular recess and the material making up the magnetic armature, in order to prevent jamming of the magnetic armature.

It will be appreciated that when the magnetic valve according to the invention is in operation, a relative displacement between the slide 2 and the magnetic armature 14 in the vicinity of its interlocking bearing and connection point cannot occur, because the pre-stressing spring 5 presses the slide 2 together with the magnet armature 14 against the upper stop. Under the influence of a magnetic force, the armature moves downwardly forcing the slide downwardly to its lower stop without becoming separated from the magnetic armature due to the spring force of spring 5. The sole element or the sole connection which effects a sliding bearing therefore exists between the slide bolt 17 and the associated inner bore of the magnet armature, solely over the length of the comparatively short stroke of the magnet armature 14. Since there is no other sliding and frictional contact between the moving armature 14 and the elements surrounding it, it will be understood that only very little friction occurs at all; thus fine machining, if desired, is required only at the upper slide bearing location between the slide bolt 17 and the inner bore of the armature. The magnetic armature and the slide are preferably, however, uncoupled mechanically; that is, there is a loose, seat-type connection between the two.

The second exemplary embodiment of the present invention, shown in FIGS. 2a, 2b and 2c, relates to a magnetic valve having a rectangular embodiment of the electromagnetic element. Elements which are identical or substantially identical in both exemplary embodiments are identified by identical reference numerals in the drawings but provided with a prime, so that a repetition of the description of such elements can be dispensed with.

The exemplary embodiment of FIGS. 2a–2c is different from the first exemplary embodiment in that the primary bearing element 1b' itself is rectangular in embodiment; and the auxiliary holder element is omitted. On the upper end, the cover plate 15' which also acts as the means for magnetic short-circuiting, supports a plastic cap element 21. The plastic cap element 21 may be connected with the cover plate 15' in any desired manner, for example being sprayed onto it or by ultrasound riveting or being clamped into certain openings with nose-like protrusions passing through the openings and gripping them from behind. In order to allow the passage therethrough of the hollow-cylindrical magnet armature 14', the cover plate 15' has a central bore 22, so that the magnet armature 14' can move upward through this bore with a spacing therebetween until it strikes against the plastic cap element 21 which operates as a stop. The plastic cap element 21 contains the slide element 17' and is preferably embodied in one piece with it; the slide element 17' may be a bearing surface protrusion pointing downward and embodied in arbitrary fashion, which protrudes engagingly to a predetermined depth into the inner bore of the magnet armature 14'. In this manner as well, a satisfactory, reliable, centered and tilt-free guidance of the armature tube is attained, thereby having the further advantages already discussed above.

The connection of the combined cover plate 15' and plastic cap element 21 with the primary bearing element 6' can in turn be accomplished in any arbitrary manner, for instance as shown in FIG. 1, by crimping the rims together. In the second embodiment, however, it is preferable for two bearing noses 6a, 6b at either end of the primary bearing element to pass through appropriately embodied longitudinal openings 15a', 15b' of the cover plate. It is then possible to connect the cover plate 15' to the primary bearing part 6' in a form-locking and immovable manner by bracing these elements against one another, as shown in FIGS. 2b, 2c at 23. The plastic cap element may, in the manner of a protective cap, be drawn downward in skirt-like fashion as shown at 24 in order to prevent the intrusion of soil or the like into the magnetic interior, leaving free the passage for the bearing noses 6a, 6b through the longitudinal openings 15a', 15b' in the cover plate 15' so that the operations for effecting the bracing action fixing the cover plate can be performed.

The foregoing relates to preferred exemplary embodiments of the invention, it being understood that other embodiments and variants thereof are possible within the spirit and scope of the invention, the latter being defined by the appended claims.

What is claimed and desired to be secured by Letters Patent of the United States is:

1. A hydraulic, electromagnetically actuated slide valve for electronic transmission control means, comprising a housing, an electromagnet in said housing including a carrier, a winding on said carrier, and a magnetic armature operative in said winding, a valve slide in said slide valve, said valve slide including a protrusion on one end thereof, characterized in that said magnetic armature is a hollow-cylindrical tubular element having an inner bore that forms an upper end bearing and a lower end for slidably supporting said magnetic armature via a slide element, said lower end of the magnetic armature is effected by means of an engagement with said valve slide to act upon said valve slide which is slidably guided in an associated valve bearing block of said slide valve to adjust said valve slide in said slide valve, and said magnetic armature is supported at one end by the inner bore of the armature and said protrusion on said valve slide without any relative displacement between said magnetic armature and said valve slide during movement of the magnetic armature, a compression spring applies a force on one end of said valve slide which holds said valve slide and said armature together in axial alignment, an enclosure cap for said housing, said slide element being disposed in a stationary manner on said enclosure cap, said slide element including an associated bearing slide portion which engages the inner bore of the armature for slidably supporting said magnetic armature.

2. A hydraulic, electromagnetically actuated slide valve as defined by claim 1, characterized in that the slide element is formed by one of a group including a bolt, a cylinder pin, and a ball centrally supported on said cap.

3. A hydraulic, electromagnetically actuated slide valve as set forth by claim 2, characterized in that said protrusion on said valve slide engages the inner bore of the armature with an annular step.

4. A hydraulic, electromagnetically actuated slide valve as defined by claim 1 in which said bearing block includes a central protrusion, said housing includes a passageway opening which encompasses said central protrusion on the bearing block, said housing receiving the winding and the winding carrier with a portion of said winding and said winding carrier surrounding said central protrusion and which contains in its interior the magnetic armature in a noncontacting manner.

5. A hydraulic, electromagnetically activated slide valve as defined by claim 4, characterized in that the housing is braced annularly against the central protrusion on the bearing block.

6. A slide valve as defined by claim 4, which includes an auxiliary holder element, said auxiliary holder element including a downwardly drawn central annular portion which together with said enclosure cap is secured to said housing by crimping a rim of said housing in an annular shoulder and said slide element and is seated centrally in a bore of said enclosure cap.

7. A slide valve as defined by claim 6, characterized in that said electromagnetic element is of a rectangular embodiment and said cover plate assuring a magnetic short-circuit is combined with a further plastic cap element which may be drawn downward in skirt-like fashion, said cap element embodying said slide element in one piece, and wherein said cover plate is held by holder noses on said housing which are braced against and engage longitudinal recesses in the cover plate.

8. A slide valve as set forth in claim 1, characterized in that the slide element is embodied by an integral, deep-drawn middle hub of the cover plate.

* * * * *